United States Patent
Shipway

(10) Patent No.: US 8,993,102 B2
(45) Date of Patent: Mar. 31, 2015

(54) GLASS PANEL

(71) Applicant: Andy Shipway, Jerusalem (IL)

(72) Inventor: Andy Shipway, Jerusalem (IL)

(73) Assignee: Dip-Tech Ltd., Kfar Saba (IL)

(*) Notice: Subject to any disclaimer, the term of this patent is extended or adjusted under 35 U.S.C. 154(b) by 0 days.

(21) Appl. No.: 13/939,205

(22) Filed: Jul. 11, 2013

(65) Prior Publication Data

US 2014/0044893 A1    Feb. 13, 2014

Related U.S. Application Data

(60) Provisional application No. 61/670,735, filed on Aug. 13, 2012.

(51) Int. Cl.

| B32B 3/00 | (2006.01) |
|---|---|
| C03C 17/04 | (2006.01) |
| B41M 1/34 | (2006.01) |
| C03C 17/34 | (2006.01) |
| C09D 11/03 | (2014.01) |
| C09D 11/322 | (2014.01) |
| C09D 11/36 | (2014.01) |
| C09D 11/38 | (2014.01) |
| E04C 2/54 | (2006.01) |
| B44F 1/00 | (2006.01) |
| E04F 15/02 | (2006.01) |
| E06B 3/00 | (2006.01) |
| B41M 5/00 | (2006.01) |
| B41M 7/00 | (2006.01) |

(52) U.S. Cl.
CPC ................ *C03C 17/04* (2013.01); *B41M 1/34* (2013.01); *C03C 17/3411* (2013.01); *C09D 11/03* (2013.01); *C09D 11/322* (2013.01); *C09D 11/36* (2013.01); *C09D 11/38* (2013.01); *C03C 2217/775* (2013.01); *C03C 2218/119* (2013.01); *E04C 2/546* (2013.01); *B44F 1/00* (2013.01); *E04F 15/02172* (2013.01); *E06B 3/00* (2013.01); *B41M 5/0047* (2013.01); *B41M 5/007* (2013.01); *B41M 7/009* (2013.01)
USPC .......................... 428/195.1; 428/210; 428/29

(58) Field of Classification Search
CPC .......... B41B 1/34; B41B 5/007; C03C 17/04; C03C 17/34; C03C 2217/775; C03C 2217/72; B32B 17/06; B32B 17/068; B32B 17/10146; B32B 17/10266
USPC ............................................. 428/29, 206, 210
See application file for complete search history.

(56) References Cited

U.S. PATENT DOCUMENTS

| 2009/0214840 A1* | 8/2009 | Eron et al. ..................... 428/210 |
| 2013/0265376 A1* | 10/2013 | Gil-Torrente et al. ........ 347/102 |
| 2014/0044894 A1* | 2/2014 | Shipway ......................... 428/29 |

* cited by examiner

*Primary Examiner* — Elizabeth Mulvaney
(74) *Attorney, Agent, or Firm* — Manelli Selter PLLC; Edward J. Stemberger

(57) ABSTRACT

A glass panel includes a first surface, and a second surface and wherein the first and second surfaces are spaced apart by thickness of the glass panel. A first image is printed on the first surface of the glass panel and a second image is printed on same first surface of the glass panel and at least partially overlapping the first image. The second image printed on the first surface and at least partially overlapping the first image forms at least partially opaque imbedded into the glass panel image that when covered by a fluid becomes transparent to reveal the first image printed on the second surface of the glass panel.

13 Claims, 5 Drawing Sheets

GLASS PANEL

The present application claims priority to U.S. provisional application for patent 61/670,735 filed Jul. 12, 2012.

FIELD

The present glass panels relate to slip-resistant developable image glass panels.

BACKGROUND

Flooring tiles are commonly made of ceramic, clay, or stone. These tiles often have a special surface treatment that increases the friction coefficient and prevents slippage making movement on the tile safe. The tiles are also processed to sustain prolonged periods of wear.

Recently, glass panels (tiles) have become popular for different decorative applications including large colored panels, colored glass walls, doors, and floor tiles. It is known to place different images on one or both sides of a glass panel either to limit visual access through the glass sheets or implement a desired decorative pattern. However, glass has a low coefficient of friction, particularly when it is wet.

There are two competing requirements presented when glass panels (tiles) are used as a flooring material, namely aesthetic appearance versus safety of the glass floor. Generally, the glass surfaces could have different finishes and images printed on them that would be visually attractive. These surfaces, whilst aesthetically very pleasing to the eye of a viewer, could be slippery especially when they become cleaned or contaminated with fluids. In particular ceramic coatings, often required over plastic coatings on account of their better wear characteristics, can be as slippery as bare glass.

Cleaning of both ceramic and glass tiles covered floors require application of a cleaning fluid, which in most of the cases is water with a detergent. Application of the cleaning fluid to a tile or panel temporarily reduces the friction coefficient and in order to avoid damages to human beings, warning signs are usually temporary placed on segments of the floor being cleaned. When the cleaning fluid evaporates, the friction coefficient restores it original value and the signs are removed.

SUMMARY

A glass panel with high slip resistance can be achieved by depositing on the surface of the glass panel an ink layer and firing the ink such that glass frit particles present in the ink become fused to each other and to the glass, and non-melting materials present in the ink provide a rough surface with specific chemistry, thus changing the friction coefficient of the surface. Generally, more than one image could be printed on the same surface of the glass panel. For example, two images could be printed on the same surface of the glass panel. One of the images could have a pleasing aesthetic appearance and the other image could increase the safety of walking/moving on the glass floor. One of the images could be a monochrome image and the other one could be a color image. Alternatively, both images could be color images. The monochrome image could be just a surface having a type of "etched glass" appearance. One of the images, typically the image printed second, could at least partially overlap the first image or printed earlier image. The second image could be an opaque image printed by an ink that after being fired possess a high friction coefficient and supports formation of a non-slip surface.

The first printed image could be a pictorial image creating an aesthetic impression. Alternatively, it could provide certain information that could be important to the viewer or observer of the image. This information could be a warning message regarding the current status of the glass panel surface or could be another message. The second image, at least partially overlapping the first image, is a partially opaque or an opaque image obstructing viewing of the first image. The properties of the ink used to print the second image could be selected such as to facilitate changes in opacity of the second image. Changes in the opacity of the second image could support unobstructed or partially obstructed observation of the first image. The changes in the opacity of the second image could be caused for example, by a fluid placed over the second image. The fluid could be e.g. a cleaning fluid, an artistically applied fluid, atmospheric precipitation such as rain, or an accidentally spilled drink, and the change in the opacity of the second image could be a temporary change facilitated by the presence of the fluid. The second image opacity is restored when the fluid is removed from the image, for example, by evaporation.

When the fluid is present and the second image becomes at least partially transparent, it reveals the overlapped or partially masked by the second image segments of the first image and facilitates observation of the first image, which could be a pictorial image or just a warning message for example, "Caution Wet Floor" or any other message.

Both the first and the second image could be fired and fused into the glass panel surface. Fusion of the image into the glass panel provides the images and the glass surface with a high friction coefficient and resistance to wear. Whether wet or dry the second image maintains the high friction coefficient.

Both the first and the second image are printed images and could be printed by different printing techniques for example, screen printing or inkjet printing. In the case that the anti-slip ink is printed by inkjet printing, then the ink thickness can be varied over the area of the printed image, resulting in increased roughness that can further improve the macroscopic anti-slip properties. The present document discloses printing of images by inkjet printing methods and accordingly discloses the inks suitable for printing the first and the second image. It discloses inks that could be fired and fused into the glass panel surface. Inks that upon firing fuse to the glass surface and form an image possessing high friction coefficient. Such surface, or at least the segment of the surface covered by the second image, is inherently a high-slip resistant surface. In addition to high friction coefficient the glass panel surface covered by the second image has high hardness and excellent wear resistance. Such surface supports safe human being walking as well as repositioning of some objects, for example, furniture without damaging the surface.

The process for making a slip-resistant fluid developable image glass panels results in a long lasting, inherently high-slip resistant glass panel without the need of any post-manufacturing surface modification step or additional of slip-resistant material or coatings.

The advantages of the present glass panel coating and production process are significant because it could be safer to walk on glass tiles and when the glass cleaning by a cleaning fluid is in progress or occasionally spilled fluid or oil is on the surface of the glass panel, it will automatically reveal the developable warning message.

The glass panels disclosed could find use in roofing and walls of residential and office buildings. The ink printed on the outside surface of the glass panels will be nominally opaque in sunny weather, providing relief from excessive sunlight and heat. In rainy weather the roof and walls will become more transparent, allowing a greater proportion of light to enter through the roof.

Glossary

As used in the present disclosure the term "glass panel" means a generally transparent glass sheet including a first surface, and a second surface. The first and second surfaces are being spaced apart by thickness of the glass sheet. A glass panel could have images on one or both of its surfaces. Glass panels of different size and thickness could be used as flooring tiles, decorative walls, and roofing material.

DRAWINGS

DESCRIPTION

One problem that is therefore associated with the use of the existing glass panels or tiles is how to maintain their aesthetically very pleasing to the eye of a viewer or observer appearance and reduce the potential of slippage for a person walking on them and in particular in the times when the panels become cleaned or a fluid is occasionally spilled on them. The present glass panel and process of its manufacture as it will be explained below resolve this problem.

Figure 1:
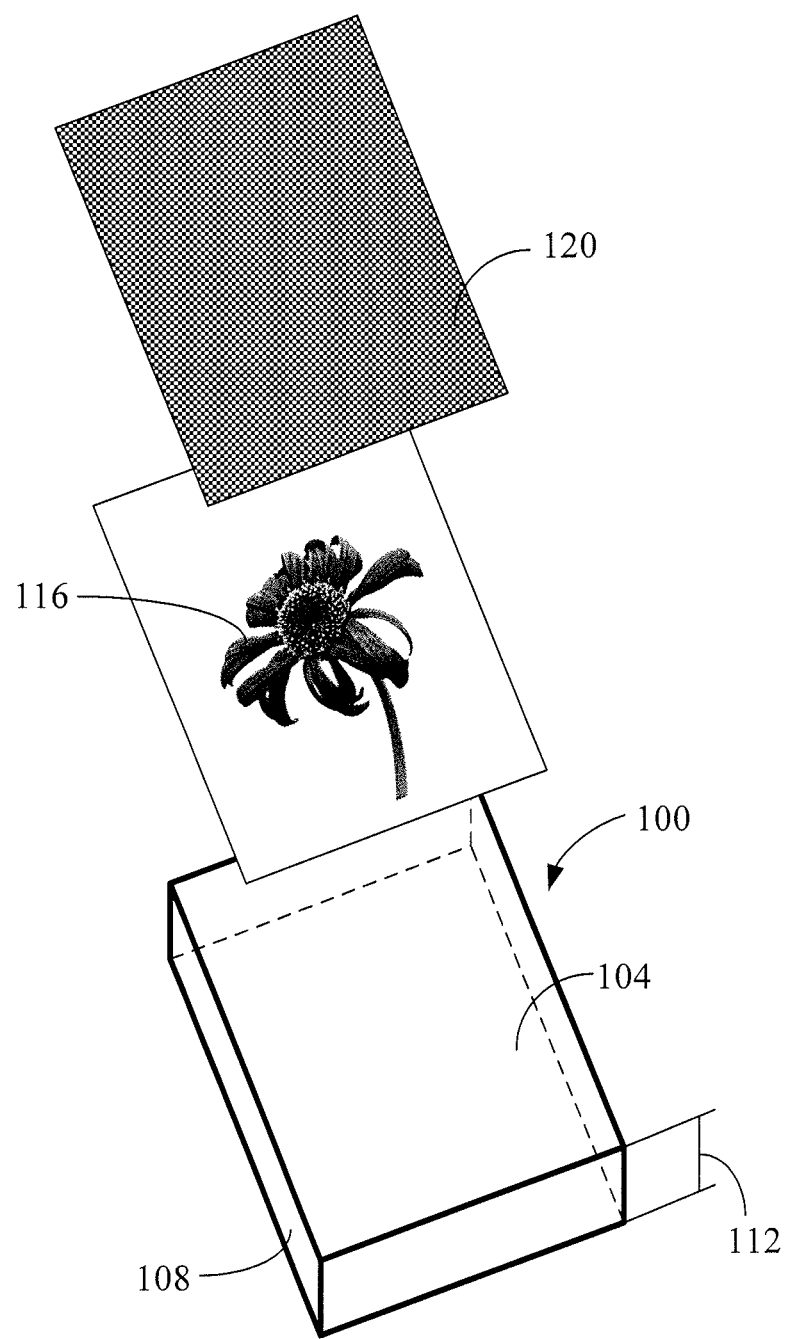
FIG. 1 is a simplified illustration of a glass panel printing process according to an example.

FIG. 1 is a simplified illustration of a glass panel printing process according to an example. A glass panel 100 is generally transparent glass sheet including a first surface 104, and second surface 108. The first surface 104 and the second surface 108 are being spaced apart by thickness 112 of the glass panel. A first image 116 is printed on first surface 104 of the glass panel 100 and a second image 120 is printed on the same first surface 104 of glass panel 100. Both the first image 116, printed on the surface of the glass panel 100, and the second image 120 could be monochrome or color images. Both the first and the second images are fired at a temperature of about 500 degrees C. to 700 degrees C. and more typically about 570 degrees C. which is the Tg temperature of most industrial glasses. As a result of the firing process both first image 116 and second image 120 become fused or imbedded into the glass panel.

Figure 2:
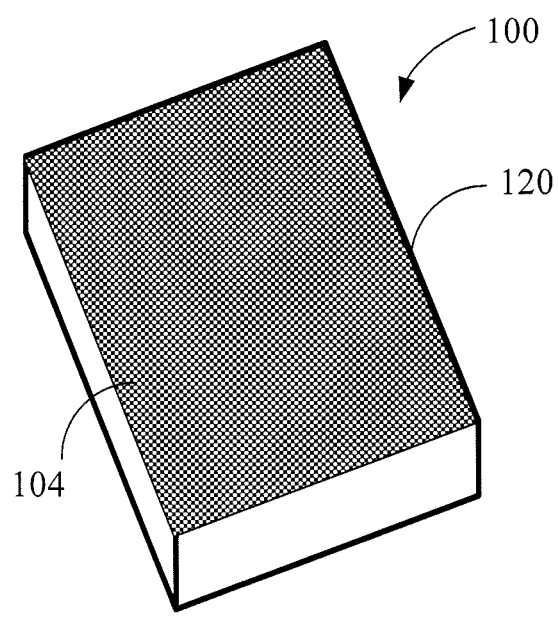
FIG. 2 is a simplified illustration of a glass panel with two images printed on one of its surfaces according to an example.

FIG. 2 is a simplified illustration of a glass panel with printed on one of its surfaces two images according to an example. Second image 120 is printed on surface of the glass panel 100 by an ink that upon firing forms a partially opaque or an opaque image. The partially opaque or opaque image is fused with the glass panel and forms a wear resistant layer with a high friction coefficient. Second image 120 after being tired provides the glass panel at least in the image area with non-slip properties. It is not necessary to tire the first image before printing the second image.

In one example the first image is printed by screen printing and the second image by inkjet printing. In an additional example, both the first and the second images could be printed by inkjet printing. Inkjet is a non-contact printing method so the unfired first printed image will not be damaged by the printing of the second image on top of it. The first printed image only needs to be dried of volatile ink components, and then the second image can be printed on top of the first image. Both images can subsequently be fired together in a single heat-treatment.

Figure 3:
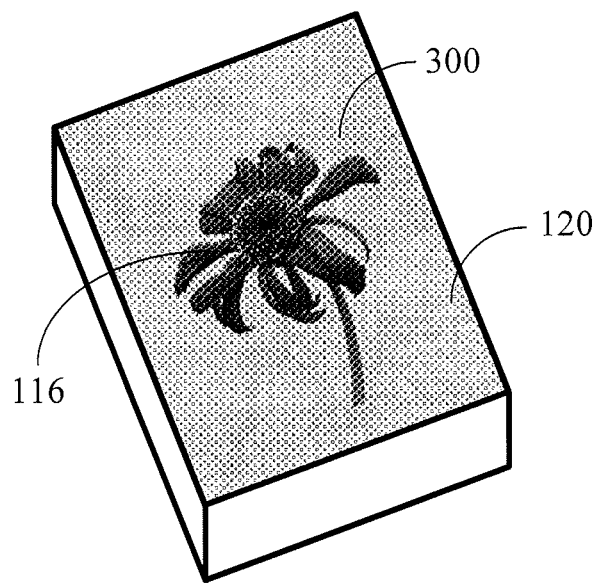
FIG. 3 is a simplified illustration of a glass panel with two images printed on one of its surfaces and a fluid layer coating one of the images according to an example.

Since second image 120 is printed on the same surface 104 of glass panel 100 as the first image 116 is printed, it is typically printed over at least a segment of the first image 116 and at least partially obscures observation or viewing of first image 116. FIG. 3 is a simplified illustration of a glass panel with two images printed on one of its surfaces and a fluid layer coating one of the images according to an example. Second image 120 when covered by a fluid layer 300 becomes at least partially transparent to reveal the first image 116 printed on the same first surface 104 of the glass panel 100. The fluid could be a transparent fluid such as water, water with a detergent, and other cleaning fluids and sprays suitable for cleaning glass surface. The fluid could also be an artistically applied fluid, atmospheric precipitation such as rain, or an accidentally spilled drink or oil, or hydrocarbons, and the change in the opacity of the second image could be a temporary change facilitated by the presence of the fluid.

Figure 4:
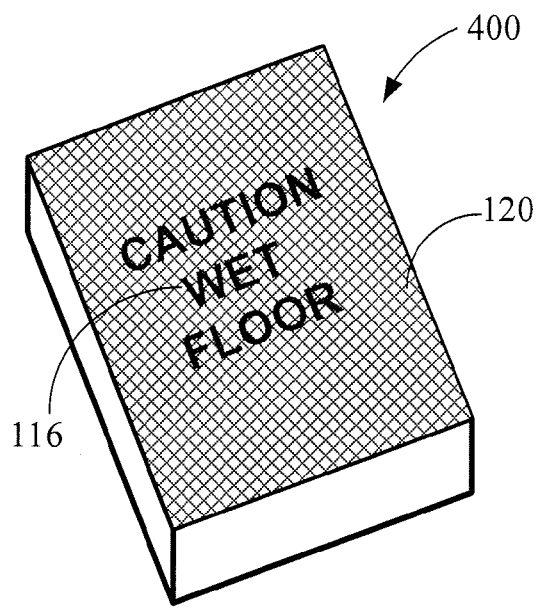
FIG. 4 is a simplified illustration of a glass panel with two images printed on one of its surfaces and a fluid layer coating one of the images according to an example.

Both first image 116, printed on the surface of the glass panel, and the second image 120 printed on the surface of the glass panel and at least partially obscuring the first image could consist of a pictorial image or textual image. FIG. 4 is a simplified illustration of a glass panel 400 with two images printed on one of its surfaces and a fluid layer coating one of the images according to an example. The first image 404 is a textual image. The textual image of FIG. 4 provides information on the status of surface 104 on which the pictorial or textual image is printed. It this case textual image 404 informs a person that the floor is wet and he or she should be careful when walking on it.

Figure 5:
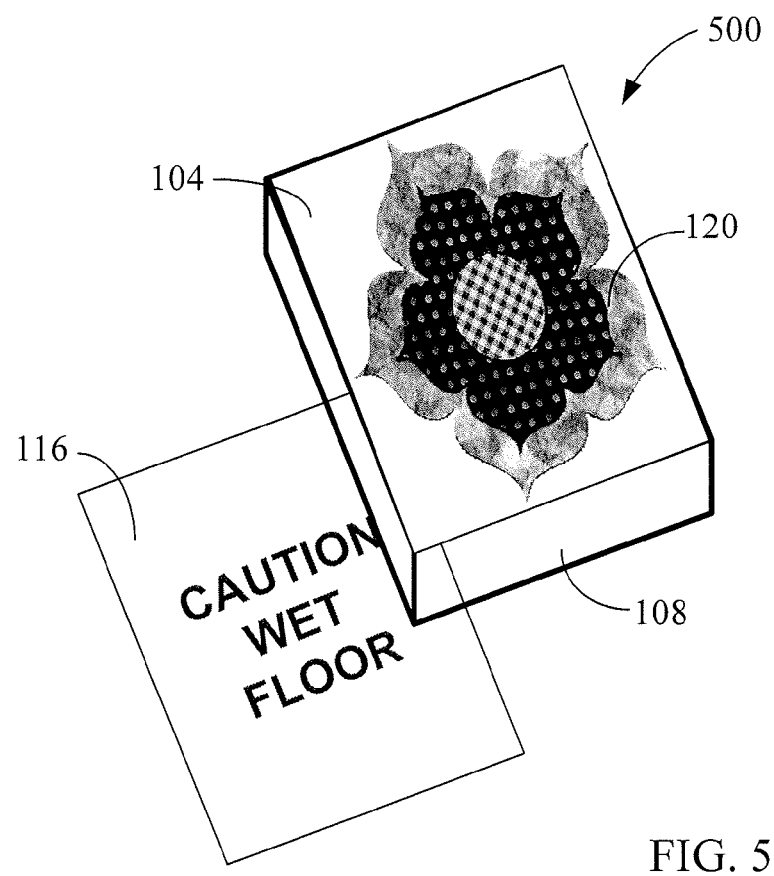
FIG. 5 is a simplified illustration of a glass panel with two images printed on different surfaces of the glass panel according to an example.

FIG. 5 is a simplified illustration of a glass panel with two images printed on different surfaces of the glass panel according to an example. Second image 120 is a color image printed on a first surface 104 of a glass panel 500. Second image 120 could be fired at a temperature of about 500 degrees C. to 700 degrees C. and more accurately about 570 degrees C., which is close to the Tg temperature of most industrial glasses. As a result of the firing process second image 120 becomes opaque and fused to or imbedded into the glass panel. Image 120 forms a wear resistant layer with a high friction coefficient and slip resistant properties.

In some examples first image 116 could be printed on second surface of glass panel 500 and it is not necessary fired. When second image 120 is covered by a fluid layer, for example, in course of the glass panel cleaning, the second image becomes at least partially transparent to reveal the first image 116 printed on the second surface 108 of the glass panel 500. Care should be taken when printing images on both sides of the glass panel, since the first image printed on the second side of the glass panel could be a mirror image of the original image.

Both the first and the second image could be printed by screen printing or by inkjet printing or by a combination of both printing methods depending on the length of the printing run. For example, the first image such as a warning message could be printed by screen printing, where the second image could be a customized image selected according to particular customer requests and desires.

In some examples, the thickness of the printed anti-slip ink layer could be varied. This is easily achieved by digital printing and in particular inkjet printing but much more difficult to do by e.g. screen printing. This "printed texture" provides further roughness to the surface of the printed ink layer on the sub-millimeter-millimeter-scale, which further improves the anti-slip quality of the layer.

When printed by inkjet printing the first image 116 could be printed by inks that fuse with the glass panel upon firing. Such inks could have a viscosity between 10 and 100 cps at jetting temperature and include an organic solvent as a vehicle, which is liquid at room temperature and as a binding composition include sub-micron particles of a glass frit composed of $SiO_2$, $Bi_2O_3$, and $B_2O_3$. The glass frit particles would typically have an average size between 0.4 and 1.2 microns. The ink would also include particles of heat resistant inorganic pigments, for example, such as metal oxides having an average size of less than 1.2 microns. Suitable metal oxides could be chromium oxide, copper oxide, titanium oxide, $Cu-Cr_2O_3$ oxides; titanium dioxide, iron oxide, Nickel antimony titanium yellow rutile, Cobalt, aluminium, blue spinel; and combinations of two or more of the above pigments. The organic solvent could be for example, PM (propylene glycol mono-methyl ether), DPM (dipropylene glycol mono methyl ether). TPM (tripropylene glycol mono methyl ether), PnB (propylene glycol mono n-butyl ether), DPnB (dipropylene glycol mono butyl ether), TPnB (trisropylene glycol mono n-butyl ether), PnP (propylene glycol mono propyl ether), DPnP (dipropylene glycol mono propyl ether), TPnB-H (propylene glycol butyl ether), PMA (propylene glycol monomethyl ether acetate). Dowanol DB (Diethylene glycol mono butyl ether) or other ethylene or propylene glycol ethers or a combination of two or more of the above solvents.

The ink composition could also include a combination of dispersants, one or more wetting agents and one or more UV-curable agents as well as a number of photoinitiators or photosensitizers.

Inks for Printing the Anti-Slip or Non-Slip Image

The second image 120 could be printed by inks, the formulation of which include elements supporting the anti-slip ink properties and facilitating ink transparency when it is covered by a layer of transparent fluid.

Typically, the anti-slip particles would be made from alumina. Alumina has a very high hardness (9.0 on Mohs scale). More importantly, it was unexpectedly discovered that alumina supports better anti-slip property than titania, copper chromate, or silicon dioxide usually used in anti-slip coatings. Without being bound by any specific theory it is believed that the anti-slip property is at least in part due to the alumina's surface chemistry. For example, high roughness surfaces with different chemistry can instead produce an opposite effect, due to the "Lotus Effect" (The "Lotus Effect" refers to the very high water repellence by a highly structured super hydrophobic surface.). Another reason for selecting alumina is its refractive index (n~1.760-1.772), which is close to that of the bismuth-based glass frit (n~1.7). It is believed that this is what allows the anti-slip layer to become nominally or partially transparent when the surface is made wet (i.e. by applying a liquid).

Alumina ($Al_3O_3$) Dispersion

Alumina (99.99% purity, nominal particle size 0.3-1.7 micron), commercially available from American Elements, Inc., Los Angeles Calif. 90024 USA, was stirred in DPM with Disperbyk-106 to give a slurry containing 70% alumina and 2% dispersant. An equal weight of zirconia milling beads was added and the mixture was stirred vigorously until the measured particle size decreased from the initial average of 1.7 microns to an average of 0.74 microns. The milling beads were then removed by filtration. The alumina dispersion was used in different percentages (21% to 30%) for preparation of the inks possessing anti-slip properties.

The average particle size of the anti-slip particles could be in the range 0.3-1.5 micron (for inkjet inks), and typically between 0.8 and 1.2 microns. For screen printed inks the anti-slip particles could be of a larger size, for example 10 or 15 micron, or even more. The amount and size of the anti-slip particles is selected to support a proper balance between the settling behavior of the ink, the jettability, the viscosity, and the fired ink layer roughness provided by large particles, within the context of the printer being used.

Glass Frit Component

The frit component or components are selected of a durable composition. The anti-slip frit supports high acid-resistance, and because of it is suitable for use as a flooring material that could sustain accidental acidic spillages (for example, some types of food or drinks) or cleaning by aggressive substances. Such frit properties are not available from most currently used low Tg frits, e.g. bismuth or zinc-based frits. Those frits have poor acid-resistance and relatively low durability.

One of the properties of the anti-slip or non-slip ink is its excellent scratch-resistance i.e., a fired ink must not be removed from the substrate by repeated scratching with a 30N sclerometer. A suitable ratio of glass frit to anti-slip particles in the ink was established through experiment. The mass ratio of glass frit to anti-slip particles in the ink is 9:5, more generally between 9:4 and 9:6. This proportion of non-fusing material is more than is used in conventional colored inks (i.e. in the form of pigments). The glass frit is usually used as 70% dispersion in different solvents and the proportion of the dispersion can vary between 40% to 60%. The conventional colored inks require gloss, but the present anti-slip ink does not require gloss. The higher the amount of anti-slip particles, the better the anti-slip property, since more particles "float" on the surface, producing submicron-scale roughness and reducing the gloss. However, too high an anti-slip particle concentration could result in reduced mechanical strength of the fused layer, which of course is not acceptable.

Typically, ink jet inks contain leveling additives rather than anti-sagging additives, on account of the low layer thickness that they are printed at. The ink for printing the second image is preferably free of leveling additives, and could contain anti-sagging additives. This means that the anti-slip inks can provide more uneven surfaces and higher-resolution, thicker textures, then other firable inks.

Below are some examples of the anti-slip ink formulations:

INK EXAMPLES

Example 1

Grey-Colored Alumina-Based Anti-Slip Ink

The ink of example 1 was prepared by mixing the following components:

| Component | Content in the ink formulation |
|---|---|
| Alumina dispersion (as described above): | 23% |
| Glass frit JFC-004 (70% dispersion in DPM with Disperbyk-180): | 45% |
| Black pigment JPC-601 (Johnson Matthey dispersion): | 3% |
| Dowanol DB (solvent) | 5% |

-continued

| Component | Content in the ink formulation |
|---|---|
| Cyclohexanone (solvent): | 4.85% |
| Laropal A81 solution (binder; 20% solution in DPM): | 10% |
| Disperbyk-180 (dispersant and wetting agent): | 2% |
| Byk-415 solution (anti-sagging agent; 10% solution in cyclohexanone): | 5% |
| Byk-430 solution (anti-sagging agent; 10% solution in cyclohexanone): | 2% |
| Byk-341 solution (surface tension reducer; 10% solution in DPM): | 0.15% |

After printing and firing the ink on glass, scratch-resistance was found to be within specifications stated above i.e., fired ink is not removed by repeated scratching with a sclerometer set to 30N.

The ink was printed on glass in a pattern of 10 mm-sized spot with the glass surface coverage of about 40%. Samples with and without light background of a different ink in the unprinted 60% of the glass surface were prepared. Spots with and without a texture pattern were printed. The PTV (Pendulum Test Value) characterizing the slip resistance value of a surface, of wet glass is around 10, and of wet glass printed with similar patterns of standard ink such as for example, DIP SPECTRUM™ inks commercially available from Dip-Tech Ltd., Kfar Saba 44643 Israel is 12. The PTV of the wet samples (average of three samples measurements according to ASTM E303) were measured to be as follows:

| Sample design | "Flat" non-textured spot surface (PTV) | "Textured" spots surface (PTV) |
|---|---|---|
| No printed background | 22.5 | 24.5 |
| With printed background | 29 | 33 |

Remark: ASTM E303-93 (2008) Standard Test Method for Measuring Surface Frictional Properties Using the British Pendulum Tester.

Conclusions:
i) The ink described in Example 1 gives a large increase in PTV over standard (conventional) inks.
ii) Textured printed areas give a better PTV than un-textured areas.

Example 2

White-Colored Anti-Slip and Picture-Hiding/Revealing Ink

The ink of Example 2 was prepared by mixing the following components:

| Ink Formulation Component | Content in the ink formulation |
|---|---|
| Alumina dispersion (as described above): | 21% |
| Glass frit (70% dispersion in DPM with Dispersant): | 50% |
| Dowanol DB (solvent) | 5% |
| Laropal A81 solution (binder; 20% solution in DPM): | 10% |
| Disperbyk-106 (dispersant and wetting agent): | 1% |
| Byk-415 solution (anti-sagging agent; 10% solution in cyclohexanone): | 9% |
| Byk-430 solution (anti-sagging agent; 10% solution in cyclohexanone): | 3.8% |
| Byk-341 solution (surface tension reducer; 10% solution in DPM): | 0.2% |

The ink was printed on glass in a pattern of 10 mm-sized spot with a glass surface coverage of 40%. Spots with "target" and "spider web" textures were printed. The PTV of wet glass is around 10, and of wet glass printed with similar patterns of standard ink (Dip-Tech black ink) is 12. The PTV of the wet samples (average of three samples measurements according to ASTM E303 Standard) were measured to be as follows:

| Printed Sample Design | "Textured" surface spots (PVT) |
|---|---|
| "Target" | 30.5 |
| "Spider web" | 31.0 |

Samples were printed which included standard black ink, such as DIP SPECTRUM™ ink commercially available from Dip-Tech Ltd., Kfar Saba 44643 Israel covered with ink of Example 2. These samples were light grey in appearance when dry, but became dark grey upon wetting with water, oil, or other liquids. This process was entirely reversible, with the sample becoming light grey again after frying, and could be carried out for multiple cycles without any evidence of loss of function. Pictures and messages (as dark grey on light grey) could be created by painting on the sample with water.

Conclusions:
i) The ink described gives a large increase in PTV over standard printing inks.
ii) ii) The ink described adequately demonstrates a "picture hide/reveal" function.

Example 3

Ink with High-Concentration of Black Pigment

The ink of Example 3 was prepared by mixing the following components:

| Ink Formulation Component | Content in the formulation |
|---|---|
| Glass frit (70% dispersion in DPM with Dispersant) | 49% |
| Black pigment JPC-601 (Johnson Matthey dispersion) | 25% |
| Dowanol DB (solvent) | 5% |
| Cyclohexanone (solvent) | 5% |
| B-66 binder solution (10% solution in DPM) | 10% |
| Disperbyk-180 (dispersant and wetting agent) | 0.8% |
| Byk-415 solution (anti-sagging agent) | 0.6% |
| Propylene glycol diacetate: | 4.5% |
| Byk-341 solution (surface tension reducer; solution in DPM) | 0.1% |

The ink was printed on glass in a pattern of 10 mm-sized spot with a glass coverage of 40%. Spots with and without a lower-thickness inner spot (thus creating some texture) were printed. The PTV of wet glass is around 10. The PTV of the wet samples (average of three samples measurements according to. ASTM E303) were measured to be as follows:

| Printed Sample Design | "Flat" non-textured spot surface (PTV) | "Textured" spots surface (PTV) |
|---|---|---|
| Round spots | 21.6 | 23.4 |

Conclusions:
i) The ink described gives an increase in PTV over standard inks such as for example, DIP SPECTRUM™ inks commercially available from Dip-Tech Ltd., Kfar Saba 44643 Israel on account of its very high pigment content. However, the PTV remains lower than for alumina-containing inks.

ii) Textured printed areas give a better PTV than un-textured areas.

Example 4

Ink Providing Etch-Effect, High Acid-Resistance Anti-Slip Ink

The combination of index-matching (of frit and alumina) together with the micro-rough surface, as we know provides efficient scattering of light. This effect can also be used to produce an "etched glass" effect. It was discovered that the "etched glass" or "frosted glass" effect could be enhanced by selecting a glass frit that most closely matches the refractive index of alumina (within $\Delta n=0.1$ or the refractive index of the alumina). For example such glass frit as JFC-004 commercially available from Johnson-Matthey Plc., Stoke-on-Trent ST11 9RD United Kingdom. The "etched glass" effect is lost when the glass becomes wet and the glass becomes transparent.

The ink of Example 4 was prepared by mixing the following components:

| Ink Formulation Component | Content in the ink Formulation |
|---|---|
| Alumina dispersion (as described above) | 25% |
| Glass frit JFC-004 (as-received 70% dispersion) | 45% |
| Laropal A81 solution (binder; 20% solution in DPM) | 10% |
| Disperbyk-180 (dispersant and wetting agent) | 2% |
| Byk-341 solution (surface tension reducer; 10% solution in DPM) | 0.1% |
| DPM (solvent) | 17.9% |

The ink was used to create drawdown samples. After drawdown and firing the ink on glass, scratch-resistance was found to be within specifications (fired ink could not be removed by repeated scratching with a sclerometer set to 30N). The anti-slip quality of the samples was qualitatively found to be comparable to the other alumina-containing inks.

The qualitative appearance of the samples was almost identical to acid-etched glass samples or sand blasted glass samples. When placed printed side-down on a surface, it appeared almost as clean, unprinted glass, but with any gap between the surface and the printed side, the "frosted" appearance was noted, obscuring the object behind the glass to the viewer while allowing most of the incident light to pass through the glass (as scattered rather than directly transmitted light).

The printed side of the glass was exposed to an etch solution of (i) 0.1M HCl; (ii) 0.1N $H_2SO_4$; (iii) 4% acetic acid and (iv) 10% citric acid, at ambient temperature for a period of 15 minutes. After cleaning the glass, no sign of the exposure to etch solution was evident.

In addition, the ink was printed on glass in a pattern of 10 mm-sized spots with a glass surface coverage of 40%. Spots with "spider web" textures were printed. The PTV of wet glass is around 10, and of wet glass printed with similar patterns of standard ink (Dip-Tech black ink) is 12. The PTV of the wet samples (average of three samples measurements according to ASTM E303 Standard) were measured to be 70 i.e. exceeding even the most strict specifications for industrial anti-slip surfaces.

Conclusions:
i) The combination of a suitable alumina dispersion and an appropriate frit in the right ratio give an excellent etch-effect coating.
ii) The use of appropriate frit results in an anti-slip or etch-effect with high acid resistance.
iii) The combination of a suitable alumina dispersion and an appropriate frit in the right ratio, together with an optimized printed texture, gives an excellent anti-slip surface.

The glass panel and the method of revealing a hidden image could be used in curtain walls, floors, in shower areas and kitchen back splashes. The second image could be a standard and well accepted image of polka dots or line patterns, or could be a pleasing, artistic image. Image color selection is almost unlimited since the printing is conducted by, for example, standard Cyan, Magenta, Yellow, White, and Black color inks. The hidden image is revealed when the second image printed on the first surface of the glass panel becomes covered by a transparent fluid. The fluid could be applied intentionally, in course of the cleaning process or occasionally, when it is spilled in a kitchen or the shower area becomes wet or when it rains.

Figure 6:
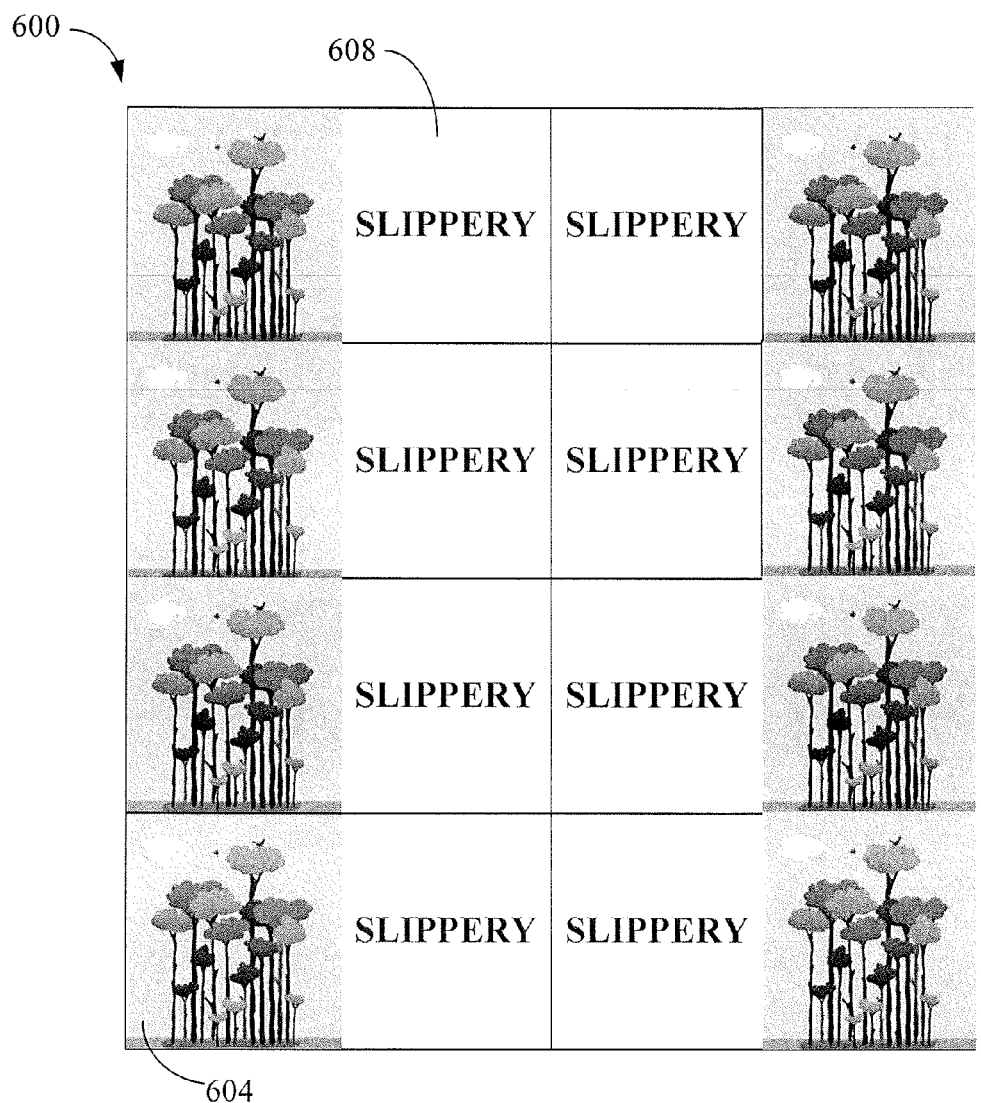
FIG. 6 is a simplified illustration of decorative glass floor or a walk side with improved slip-resistance and revealed image according to an example.

FIG. 6 is a simplified illustration of decorative glass panel covered floor or a walk side with improved slip-resistance and revealed image according to an example. The decorative glass floor or walk side 600 with improved slip-resistance includes an assembly of generally transparent glass panels (tiles) 608, similar to panels (tiles) 100 or 400 or 500 with each panel/sheet including a first image printed on one of the surfaces of the glass panel/sheet and a second image printed on the same surface of the glass sheet and at least partially overlapping the first image. As explained above, the second image is printed over at least a segment of the first image and forms a partially opaque or an opaque imbedded into the glass sheet image with a high friction coefficient improving the slip-resistance of the glass panel (tile).

The walk side is surrounded on both sides by greenery 604 schematically shown as trees. When the greenery is irrigated or a rain falls down, the water makes the second image printed on the glass panels transparent and develops/reveals the first, hidden image, which is a warning that the side walk has become slippery could be observed.

Figure 7A:
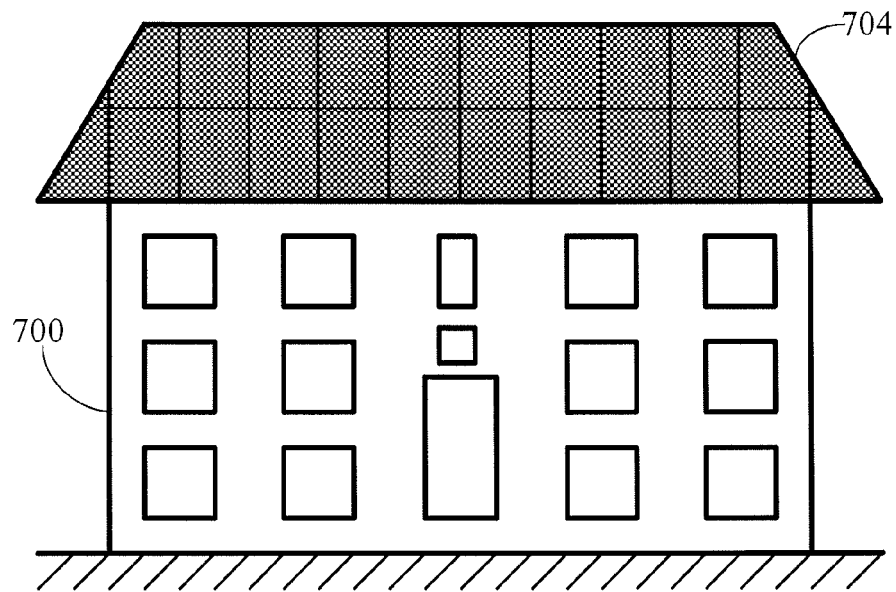
FIGS. 7A and 7B are simplified illustrations of a building with a roof covered by the present glass panels according to an example.
Figure 7B:
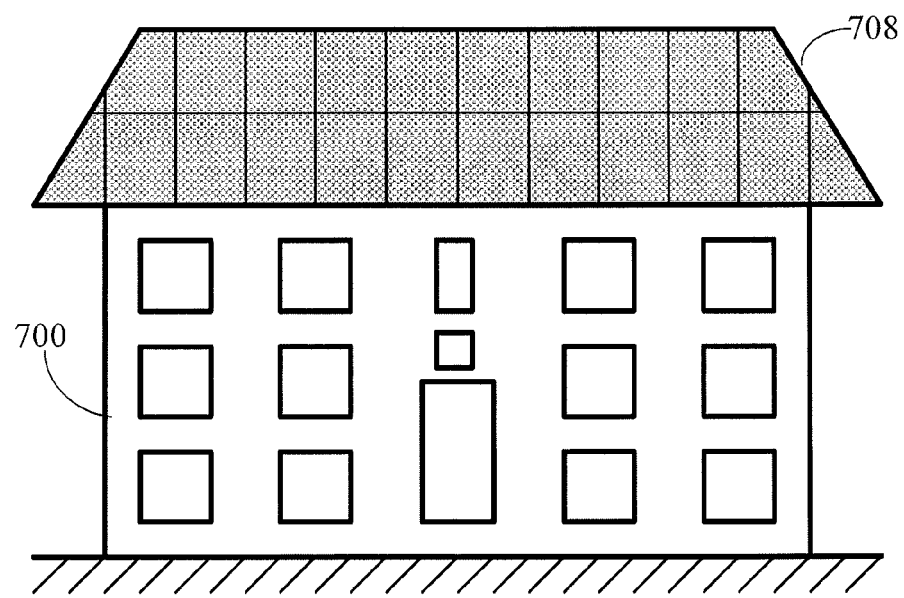

Roofing of residential and office buildings by the disclosed glass panels could be another environmentally friendly application. FIG. 7 is a simplified illustration of a building 700 with a roof 704 covered by the present glass panels. The ink printed on the outside (first surface) of the glass panels will be nominally opaque in sunny weather, providing relief from excessive sunlight and heat. In rainy weather the roof 708 (FIG. 7B) will become more transparent, allowing a greater proportion of light to enter through the roof just when it is needed. In sunny days such a roof saves electricity by reducing the air conditioning costs and in rainy days, it reduces the amount of electricity required to provide adequate illumination for work or living. In such applications only the second image needs to be be printed on the outside (first) surface of the glass panel, although for aesthetic or decorative purposes, the first image that is obscured or revealed by the second image could be also printed. The first image could be printed on the first (outer) surface of the glass panel or on the second (inner) surface of the glass panel.

Therefore, the disclosed glass panels provide environmentally friendly, fully recyclable construction material. The glass panels enhance electricity savings and provide a pleasing aesthetic appearance to interior or exterior images.

The glass panels with slip-resistant developable image glass panel could be produced in different sizes and with different images. The developable image saves the need for warning signs and facilitates cleaning processes. The high friction non-slip surface reduces slip and fall accidents and reduces liability costs and insurance premiums especially for the operators of public spaces where the accidents tend to occur.

What is claimed is:

1. A glass panel, comprising:
a first surface, and a second surface and wherein the first and second surfaces are spaced apart by thickness of the glass panel; and
a first image printed on the first surface of the glass panel and a second image printed on same first surface of the glass panel and at least partially overlapping the first image;
wherein the second image printed on the first surface and at least partially overlapping the first image forms at least partially opaque imbedded into the glass panel image that when covered by a fluid becomes transparent to reveal the first image printed on the second surface of the glass panel.

2. The glass panel according to claim 1, wherein the second image printed on the first surface of the glass panel upon firing forms an opaque fused with the glass panel image with a high friction coefficient.

3. The glass panel according to claim 1, wherein the second image printed on the first surface is a monochrome or color image with high friction coefficient and wherein the second image is one of a group of images consisting of a pictorial or textual image.

4. The glass panel according to claim 1, wherein the second image printed on the surface of the glass panel (after being fired) provides the glass panel with non-slip properties.

5. The glass panel according to claim 1, wherein the first image printed on the first surface of the glass panel is one of a group of images consisting of a monochrome or color image.

6. The glass panel according to claim 1, wherein the first image printed on the surface of the glass panel is one of a group of images consisting of a pictorial or textual image and wherein the pictorial or textual image provides information on status of the surface on which the pictorial or textual image is printed.

7. The glass panel according to claim 1, wherein the fluid is a transparent fluid being one a group of fluids consisting of water, water with a detergent, drink, oil, hydrocarbons, and a cleaning fluid.

8. The glass panel according to claim 1, wherein the first and the second image are printed by one of a group of printing methods consisting of screen printing and inkjet printing and wherein the first image is printed by ink supporting ink fusing with the glass panel upon firing.

9. The glass panel according to claim 1, wherein the second image is printed by ink including at least anti-slip particles and wherein the anti-slip particles are alumina particles and wherein the ink including at least anti-slip particles includes particles with an average particle size in range 0.3-1.5 micron.

10. The glass panel according to claim 1, wherein the second image is printed by ink including at least anti-slip particles also includes glass frit and wherein ratio of glass frit to anti-slip particles is at least 9:4.

11. The glass panel according to claim 1, wherein the second image is printed by ink including at least anti-slip particles is free from leveling additives and contains anti-sagging component.

12. The glass panel according to claim 1, wherein the first image is printed on a second side of the glass panel.

13. The glass panel according to claim 1, wherein the second image printed on a first side of the glass panel and produces an "etched glass" image.

* * * * *